United States Patent [19]

Cornelius

[11] 3,811,617

[45] May 21, 1974

[54] 90° SAFETY SHUTOFF SYSTEM FOR SELF-PROPELLED SPRINKLING APPARATUS

[75] Inventor: Gail L. Cornelius, Portland, Oreg.

[73] Assignee: R. M. Wade & Co., Portland, Oreg.

[22] Filed: Apr. 10, 1970

[21] Appl. No.: 27,226

[52] U.S. Cl............................. 239/189, 239/212
[51] Int. Cl............................................. B05b 3/00
[58] Field of Search .......... 239/177, 178, 212, 189, 239/190, 191, 183

[56] References Cited
UNITED STATES PATENTS

| | | | |
|---|---|---|---|
| 3,281,080 | 10/1966 | Hogg | 239/212 |
| 2,893,643 | 7/1959 | Gordon | 239/177 X |
| 3,001,721 | 9/1961 | Zybach | 239/177 |
| 3,255,968 | 6/1966 | Stafford | 239/212 |
| 3,386,661 | 6/1968 | Olson et al. | 137/344 X |

Primary Examiner—M. Henson Wood, Jr.
Assistant Examiner—John J. Love
Attorney, Agent, or Firm—Phillips, Moore, Weissenberger Lempio & Strabala

[57] ABSTRACT

A safety control system for shutting down a self-propelled sprinkling apparatus when the long line of spaced self-propelled towers, and thus the pipeline supported thereby, deviates by a given angle from a 90° relationship relative to the direction of movement of a driving means located at its end. Valve means is suitably supported, whereby excessive leading or lagging deviation of the pipeline from the 90° relationship is sensed by the valve means, to in turn actuate means which terminates the water input to the pipeline and shuts down the apparatus.

6 Claims, 4 Drawing Figures

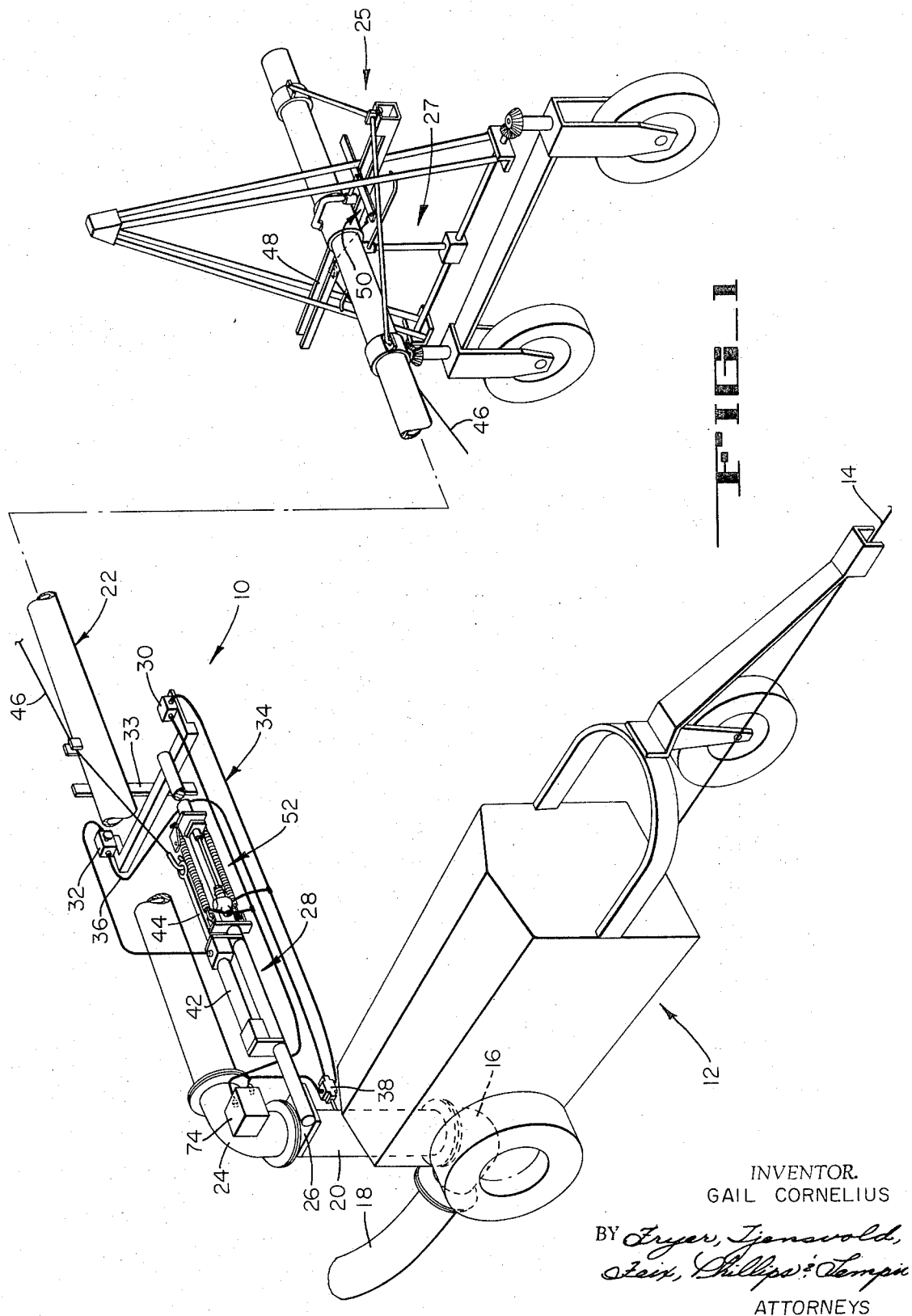

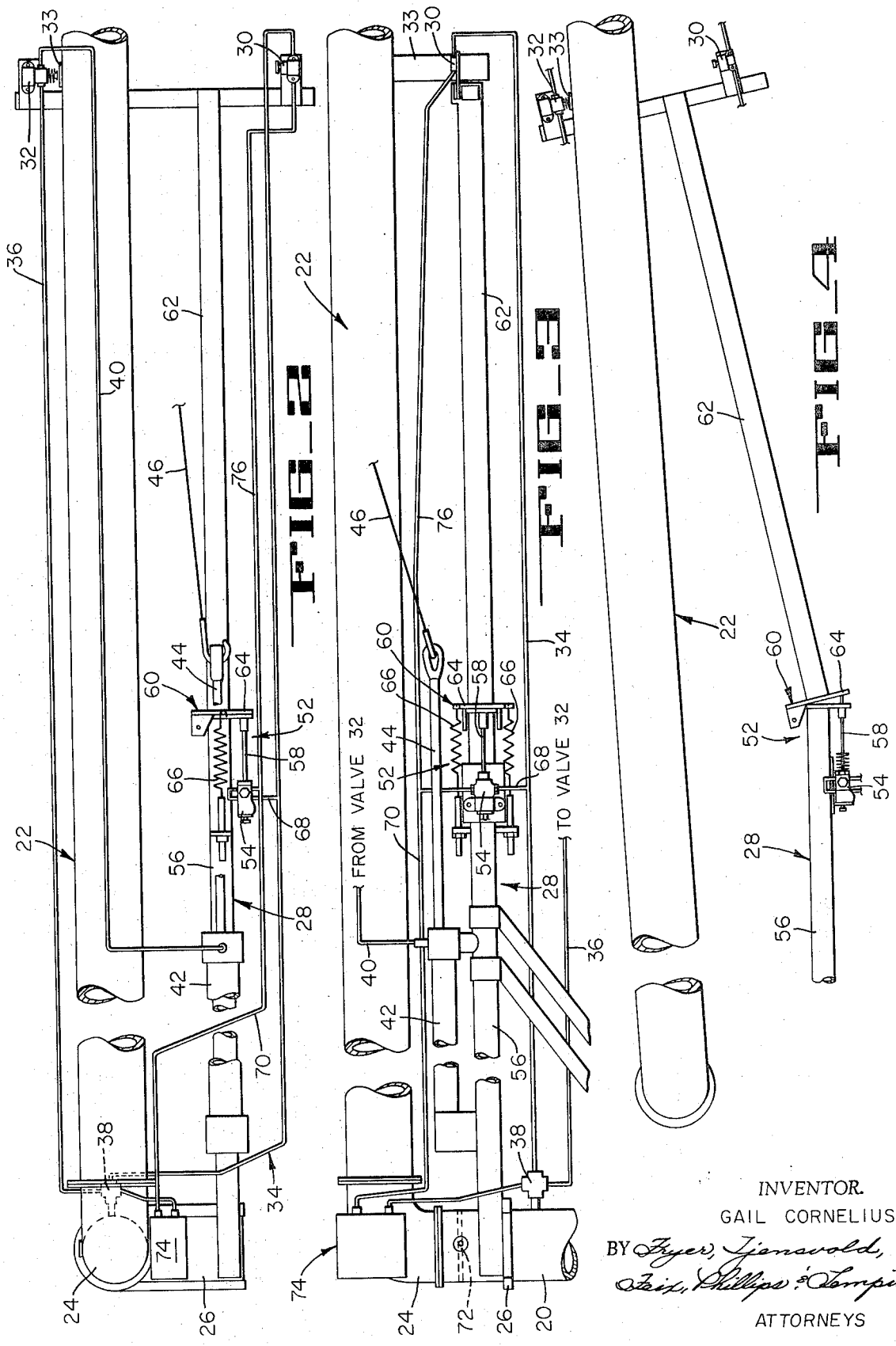

90° SAFETY SHUTOFF SYSTEM FOR SELF-PROPELLED SPRINKLING APPARATUS

BACKGROUND OF THE INVENTION

1. Field

The invention relates to a safety control system for a laterally moving automatic sprinkling apparatus, for shutting down the apparatus when the long line of pipe starts to angle excessively from its intended lateral direction. The actual apparatus, various control features, drive gearing, and other related features are disclosed in my Assignee's copending applications entitled, WHEEL AND DRIVE MEANS FOR IRRIGATION SPRINKLER SYSTEM, Ser. No. 805,706 now U.S. Pat. No. 3,583,639, LATERALLY MOVING AUTOMATIC IRRIGATION SYSTEM, Ser. No. 805,664 now U.S. Pat. No. 3,583,428, both applications filed Mar. 10, 1969, and SAFETY SHUT OFF SYSTEM FOR INDIVIDUAL TOWERS OF AN AUTOMATIC IRRIGATION SYSTEM, Ser. No. 30,824, filed Apr. 22, 1970.

2. Prior Art

Various systems have been developed for moving a pipeline of, for example, a quarter of a mile in length laterally across a large field. Typical is the apparatus which feeds water to one end of the line via an extremely durable supply hose which is dragged on the ground. Difficulties are encountered in trying to keep the pipelines straight and traveling at a right angle to the intended direction of travel. Driving the wheels of the apparatus at exactly the same speed does not prove effective since variations in the terrain levels and conditions cause corresponding variations in the lateral speed of the individual support towers.

The applications of previous mention disclose an improved, laterally moving automatic sprinkling apparatus capable of moving forwardly on a substantially straight course with a minimum of attention, for extended periods of time. A sprinkler pipeline, fed by a flexible hose, is carried above the ground on a spaced series of wheeled towers. Each tower has a water powered motor whose output is coupled to the wheels via reduction gearing, shafts, etc. Automatic control means associated with each tower regulates its speed relative to adjacent towers whereby the line of pipe is maintained substantially straight as it progresses laterally across the field.

In the latter system, initial movement is imparted to the pipeline by a tractor, including a winch driven by a gasoline engine, which winds a cable thereon at greatly reduced speed. The cable extends along one edge of the field being irrigated with the opposite end of the cable anchored at the opposite end of the field. A flexible water input hose is coupled to the tractor and thence to the pipeline via a riser and swivel joint. The last tower in the pipeline travels at a greater speed, e.g., twice the speed of the tractor.

Thus, initial movement of the tractor causes the advance of each succeeding tower until the last tower is actuated. As the last tower advances, (at generally twice the speed of the tractor) it tends to straighten the curved pipe stopping the towers in progression from the last towards those towers nearest the tractor.

As may be seen, though the apparatus described above provides an improved system for maintaining the line of pipe substantially straight, situations arise wherein although the individual towers are in substantial alignment with each other, the entire pipeline may become misaligned, i.e., may begin to angle across the field rather than proceed laterally in a direction parallel to the winch cable. This situation may occur, for example, when an end tower becomes stuck in an ON condition, and the end tower starts to move ahead of the winch tractor. Eventually, if left unchecked, the end tower will literally precess the pipeline around the winch tractor without any individual tower becoming misaligned. On the other hand, the end tower may stall, thereby causing the entire pipeline to lag behind the winch tractor, even though the line remains substantially straight. In either situation severe damage to the apparatus generally results.

SUMMARY OF THE INVENTION

The present invention overcomes the disadvantageous situations noted above wherein the entire pipeline deviates in a straight line away from the intended lateral direction. A bracket member carried by the tractor supports a pair of hydraulic valves at positions indicative of the limits to which the pipeline can pivot about the tractor without activating the 90° safety shutoff of the invention. If the pipeline deviates from the 90° relationship (i.e., leads or lags) by an amount greater than defined by the valves' positions, the action of the pipeline against the bracket member selectively actuates one of the valves via their respective plunger. This in turn shuts off a butterfly valve via suitable hydraulic pilot valves, levers, etc. The butterfly valve is situated in the input line leading to the pipeline, and closure of the valve terminates the flow of water to the pipeline, to thus shut down the entire apparatus. Accordingly, the invention provides means, preferably hydraulic, to define a safety shutoff system which is actuated by an excessive and selectable angular variation of the pipeline from an angle normal to the intended direction of travel.

BRIEF DESCRIPTION OF THE DRAWINGS

FIG. 1 is a perspective showing pertinent portions of the automatic sprinkling apparatus, further illustrating an embodiment of the invention 90° safety shutoff system in combination therewith.

FIGS. 2 and 3 are a plan and an elevation respectively showing in greater detail the embodiment of the invention, by way of example only.

FIG. 4 is a plan of the invention showing the disposition of the invention in the situation where the pipeline deviates in a lagging relation from the desired 90° relationship beyond a given angular limit.

DESCRIPTION OF THE PREFERRED EMBODIMENTS

Regarding FIG. 1, a winch tractor 12 of a self-propelled sprinkling apparatus 10, is directed along one side of the field to be irrigated by a cable 14 anchored at its opposite end (not shown) to the respective end of the field. The tractor 12 has a gasoline engine coupled to a winch upon which the cable 14 is slowly wound, thus, providing motivation to the tractor. An inlet pipe 16 (90° elbow) is coupled to a long flexible hose 18 of selected diameter and length, whereby the tractor 12 drags the hose along the ground as it winds the cable 14 upon the winch while progressing across the field. The opposite end of the hose 18 is coupled to a water well, pump, etc, and provides means for continuously introducing water to the sprinkling apparatus 10.

A water pipe riser 20 secured to the tractor 12 is coupled to the flexible hose 18 via the input pipe 16, and is coupled to the respective end of a long line of pipe sections, indicated at 22, via a swivel joint 24.

As described in greater detail in the above mentioned application, Ser. No. 805,664, initial movement is applied to the sprinkler apparatus 10 by movement of the winch tractor 12 along the cable 14. The resulting bending of the pipe 22 between the tractor and a first propelled tower (not shown) initiates movement of the tower. This causes bending of the pipe between the first and second towers, which in turn initiates movement of the second tower. The action continues on down the line of towers, until the last tower, herein termed an end or control tower 25, wherein a water-motor 27 is preset to cause the control tower 25 to travel at greater, e.g., twice, the speed of the winch tractor 12. As the end or control tower advances it straightens the curved pipe 22 bringing to rest the succession of towers starting with the last tower and proceeding toward those nearest the tractor 12.

Since the 90° safety control system of the invention is generally associated with the tower control mechanism for energizing the water-motor 27 of the control tower 25, the following description includes portions of that mechanism in the invention combination. To this end, referring to FIGS. 1–3, a bracket 26 is rigidly secured to the riser 20 which, in turn, is secured to the back of the winch tractor 12. An elongated tee bracket 28 is rigidly secured at one end to the bracket 26 and extends therefrom at substantially 90° to the direction of travel of the winch tractor and thus generally along the pipe 22. A normally closed, two-way, safety shutoff valve 30, and a three-way end tower control valve 32 are affixed to either end of the tee bracket 28. Note the valve 32 provides control for the control tower 25 as described in the above application Ser. No. 805,664, and the valve 30 is concerned with the invention combination as further described below.

A contact plate 33 is affixed to the pipeline 22 and extends downwardly to engage the respective plungers of either valves 30 or 32 upon excessive deviation of the pipeline 22. Water under pressure is supplied to the safety shutoff valve 30 and the control valve 32 via lines 34 and 36 respectively, which lines extend from a multiple outlet tap fixture 38 in the riser 20. The control valve 32 controls the flow of pressure through a line 40 to a cylinder 42 preferably secured to the tee bracket 28. The cylinder has a piston and a rod 44, which upon retraction pulls a cable 46 towards the tractor end of the pipeline 22. The cable 46 is guided through suitable fair-leads at the ends of cross-beams on all the towers (not shown, but similar to a cross-beam 48 on the control tower 25) until it reaches the control tower 25. The cable 46 is suitably coupled to means for driving the water-motor 27, via a lever assembly 50. Pulling on the cable 46 via the rod 44 supplies water pressure to the water-motor 27 to operate the control tower 25 at the given greater speed.

In operation, when pipe 22 is essentially at 90° with the tractor direction of travel, it does not bear against the three-way valve 32, which thus does not provide water pressure to the cylinder 42. Motor 27 of control tower 25 remains at rest. As the tractor (and successive intermediate towers) move ahead, the pipe 22 lags and thus bears against the three-way valve 32, opening pressure to the cylinder 42 to cause movement of the control tower 25 per the previously described mechanism. Note that the mechanism for energizing the water-motor 27 of control tower 25 includes generally the cylinder 42, rod 44, cable 46, part of the bracket 28, the three-way valve 32, lines 36, 40 and lever assembly 50, which mechanism is described in further detail in the above mentioned copending application Ser. No. 805,664.

As may be seen, if the end or control tower 25 fails to shut off, or if it fails to start, the entire pipeline tends to progressively increase its lead, or its lag respectively, of the winch tractor 12. This causes the entire line to circle the winch tractor, finally resulting in severe damage to the sprinkling apparatus 10.

Therefore, in accordance with the invention, and referring to FIGS. 2–4, the tee bracket 28 is further provided with a spring loaded, hinge assembly 52 for selectively actuating a normally closed two-way safety shutoff valve 54. To this end, the valve 54 is secured to a fixed member 56 of the tee bracket 28 and has an actuating plunger rod 58 extending therefrom. A hinge 60 is secured to the end of member 56 and to the confronting end of a pivotable member 62. The actuating rod 58 of the two-way valve 54 extends to and bears against an extended portion 64 of the hinge strap, which is pivotable with the bracket pivotable member 62. Springs 66 are secured between the hinge strap portion 64 and the rigid member 56 of the tee bracket 28 and tend to hold the hinge 60 in a "closed" position.

Water under pressure is supplied through the normally closed two-way valve 54 via the line 34 and a line 68, and the valve controls the flow of pressure through a line 70 to a miniature cylinder assembly which activates a four-way valve (not shown) and in turn closes a butterfly valve disposed within the riser 20, and indicated in FIG. 3 by numeral 72. The butterfly valve 72 is disposed downstream from the position of the tap fixture 38. The miniature cylinder and four-way valve, which act as a pilot and actuating mechanism for rotating the butterfly valve 72, are generally illustrated herein as at 74. The two-way safety shutoff valve 30 also controls the flow of pressure through a line 76 and the line 70 to the butterfly valve actuating mechanism 74.

In operation of the invention safety shutoff system, as long as the tractor 12, the control tower 25, and the intermediate self-propelled towers (not shown) are operating properly relative to their intended lateral direction, the end tower control valve 32 selectively energizes the control tower 25 in response to contact, or lack of contact of the pipe 22 with the valve 32. However if, for example, the control tower 25 fails to shut off for any reason, the pipeline 22 will tend to pull progressively ahead of the tractor 12, causing the pipeline 22 to pivot forward excessively until the contact plate 33 bears against the plunger of the safety shutoff valve 30. This action opens valve 30 to provide the flow of pressure to the butterfly valve actuating mechanism 74 via lines 76, 70, thereby immediately closing the butterfly valve 72 as hereinbefore described, and shutting down the entire sprinkling apparatus.

On the other hand, referring to FIG. 4 in particular, if the control tower 25 fails to start with normal contact of the contact plate 33 against the control valve 32, the tractor 12 will tend to pull progressively ahead of the lagging pipeline 22. Continued contact of the contact plate 33 with the control valve 32 will provide sufficient force to the pivotable member 62 of the tee bracket 28 to overcome the holding force of the springs 66. Thus, hinge 60 will likewise pivot "open", and upon pivoting through a selected angle will allow the actuating rod 58 to translate sufficiently to open the safety shutoff valve 54. As in the situation wherein the pipeline 22 leads the tractor excessively, the resulting flow of pressure from the now open valve 54 via line 70, actuates the butterfly valve 72 and shuts down the entire sprinkling apparatus 10 by terminating the flow of water to the pipeline.

Through the hinge modifications to the tee bracket 28, the safety shutoff valves 30, 54, and the associated lines, any regular deviation of the pipeline 22 beyond the normal operational limits, determined by the spacing between the valves 30, 32 and the selected pivot angle of the hinge assembly 52, indicates a possible major failure in the sprinkling apparatus 10 function and results in shutdown of the entire apparatus.

Although the invention has been hereinbefore described and illustrated in the drawing with respect to one embodiment, it is also apparent that further modifications and changes may be made therein without departing from the spirit of the invention. For instance, the winch tractor may drive strings of pipe extending to either side thereof. In such event a duplicate safety shutoff device may be provided thereon for detection of pipe misalignment in either direction normal to the tractor travel.

Thus it is not intended to limit the invention except by the terms of the appended claims.

What is claimed is:

1. A safety shutoff system for automatic irrigation apparatus which includes a long, relatively-straight line of pipe carried on a plurality of self-propelled towers, a tractor connected to said line of pipe and adapted to move with the line of pipe in a pre-selected lateral direction across a field, said line extending at substantially a 90° relationship with the direction of travel of said tractor, said system comprising:
   means for sensing an excessive angular deviation of the line from the 90° relationship with said tractor's direction of travel; and
   means responsive to the means for sensing for selectively terminating the movement of and flow of water to the line of pipe.

2. The safety shutoff system of claim 1 wherein the excessive angular deviation defines an arc comprising a selected angle, the limits of which define the extent to which the line of pipe may deviate from the 90° relationship with said tractor's direction of travel before actuating said responsive means.

3. The safety shutoff system of claim 2 wherein the means for sensing includes valve means selectively supported to define the extent of said selected angle of arc, wherein excessive deviation of the line selectively actuates the valve means and the means responsive to the sensing means to terminate the flow of water to the line.

4. The safety shutoff system of claim 3 wherein the means for sensing further includes bracket means rigidly secured to the tractor and extending along the pipeline, said valve means being supported by the bracket means for response to the excessive deviation of the line from 90°.

5. The safety shutoff system of claim 4 wherein said means responsive to the sensing means includes a main shutoff valve adapted to terminate the flow of water to the line of pipe; the valve means includes a first valve secured to said bracket means and responsive to excessive deviation of the line in a leading direction; hinge means integral with said bracket means for pivoting a member thereof through a select angle in response to excessive deviation of the line in a lagging direction; a second valve secured to the bracket means and responsive to the pivoting of the hinge means; and means coupled to the valves for supplying high pressure water thereto, said main shutoff valve being responsive to high pressure supplied thereto via the first and second valve means when the latter are actuated.

6. In a safety shutoff system for a laterally-moving, self-propelled irrigation apparatus including a tractor pivotally connected to a long line of tower-supported irrigation pipe, the improvement comprising:
   first means associated with said tractor and the pipe adjacent said tractor for sensing angular deviation of an axis passing along the length of said pipe in relation to a preselected direction of travel of said tractor; and
   shutoff means actuated by said first means for terminating the movement of and the flow of water to said irrigation apparatus when said angular deviation exceeds a pre-selected value.

* * * * *